United States Patent
Antonov

Patent Number: 6,044,080
Date of Patent: Mar. 28, 2000

[54] SCALABLE PARALLEL PACKET ROUTER

[75] Inventor: Vadim Antonov, Belmont, Calif.

[73] Assignee: Pluris, Inc., Palo Alto, Calif.

[21] Appl. No.: 08/752,479

[22] Filed: Nov. 19, 1996

[51] Int. Cl.[7] ............................................. H04L 12/28
[52] U.S. Cl. ............................................. 370/401; 370/235
[58] Field of Search ............................. 370/400, 366, 370/382, 384, 401, 398, 402, 403, 405, 411, 413, 389, 227, 235, 370; 395/200.7, 200.74, 200.51, 200.55, 800.13, 800.18; 714/7

[56] References Cited

U.S. PATENT DOCUMENTS

| | | | |
|---|---|---|---|
| 4,598,400 | 7/1986 | Hillis | 370/400 |
| 5,086,424 | 2/1992 | Motohashi et al. | 370/366 |
| 5,175,733 | 12/1992 | Nugent | 370/400 |
| 5,191,578 | 3/1993 | Lee | 370/418 |
| 5,218,676 | 6/1993 | Ben-Ayed et al. | 395/200.7 |
| 5,226,125 | 7/1993 | Balmer et al. | 710/132 |
| 5,247,694 | 9/1993 | Dahl | 395/800.13 |
| 5,274,631 | 12/1993 | Bhardwaj | 370/401 |
| 5,282,201 | 1/1994 | Frank et al. | 370/403 |
| 5,303,232 | 4/1994 | Proctor et al. | 370/398 |
| 5,325,362 | 6/1994 | Aziz | 370/405 |
| 5,345,556 | 9/1994 | Zapisek | 395/200.74 |
| 5,404,562 | 4/1995 | Heller et al. | 395/800.18 |
| 5,434,863 | 7/1995 | Onishi et al. | 370/402 |
| 5,440,553 | 8/1995 | Widjaja et al. | 370/411 |
| 5,469,432 | 11/1995 | Gat | 370/389 |
| 5,469,433 | 11/1995 | McAuley | 370/474 |
| 5,485,455 | 1/1996 | Dobbins et al. | 370/255 |
| 5,526,358 | 6/1996 | Gregerson et al. | 395/200.51 |
| 5,537,403 | 7/1996 | Cloonan et al. | 370/352 |
| 5,541,914 | 7/1996 | Krishnamoorthy et al. | 370/427 |
| 5,546,391 | 8/1996 | Hochschild et al. | 370/413 |
| 5,550,815 | 8/1996 | Cloonan et al. | 370/396 |
| 5,592,625 | 1/1997 | Sandberg | 711/147 |
| 5,598,408 | 1/1997 | Nickolls et al. | 370/351 |
| 5,602,841 | 2/1997 | Lebizay et al. | 370/413 |
| 5,612,957 | 3/1997 | Gregerson et al. | 370/401 |
| 5,613,067 | 3/1997 | Brady et al. | 395/200.55 |
| 5,617,413 | 4/1997 | Monacos | 370/400 |
| 5,787,070 | 7/1998 | Gupta et al. | 370/227 |

FOREIGN PATENT DOCUMENTS

| | | |
|---|---|---|
| 90308133 | 7/1990 | European Pat. Off. |
| PCT/CA95/00029 | 1/1995 | WIPO . |

OTHER PUBLICATIONS

DeHon et al., "METRO: A Router Architecture for High–Performance, Short–Haul Routing Networks", M.I.T. Transit Project <http://www.ai.mit.edu/projects/transit/tn96/tn96.html>, pp. 1–20, Oct. 1993.

Antonov et al., "The Pluris Massively Paralle Router (MPR)", <http://www.ccrc.wustl.edu/pub/ieee–tcgn/conference/gbn98/antonov–abs.html>, 1998.

Antonov, "Pluris Massively Parallel Routing (White Paper)", <http://www.academ.com/nanog/feb1998/parallel/index.html>, Feb. 1998.

Wu, T–H: "Cost–Effective Network Evolution," IEEE Communications Magazine, Sep. 1993, vol. 31, No. 9.

*Primary Examiner*—Ajit Patel
*Assistant Examiner*—Mitchell Slavitt
*Attorney, Agent, or Firm*—Pillsbury, Madison & Sutro LLP

[57] ABSTRACT

A scalable parallel packet router comprises a massively parallel computer 10 and a plurality of multiplexers 15, and is controlled by a disclosed packet routing algorithm, and a method of very high-speed packet routing. The method includes selection of an destination node by computing a hash function from source and destination addresses of a packet, so the ordering of packets is preserved.

22 Claims, 7 Drawing Sheets

6,044,080

SCALABLE PARALLEL PACKET ROUTER

TECHNICAL FIELD

This invention relates to a computer system for very high speed routing of data packets in a wide-area network.

BACKGROUND OF THE INVENTION

A typical prior art computer network allows connected computers to communicate by exchanging data packets. Two important classes of such networks are connection-oriented and connectionless packet-switching networks.

Connection-oriented technology is based on a notion of establishing a virtual connection across the network between communicating computers, the same way telephone connections are established. This approach makes packet routing very simple, requiring a single look-up in an array, so it can be implemented in high-speed circuitry. The connection-oriented approach is the basis of a technology known as Asynchronous Transfer Mode (ATM).

Although the connection-oriented technology allows very high speeds in packet forwarding, the process of establishing and tearing down connections remains a major limitation. For example, despite the very high aggregate throughput of conventional digital telephony systems, they are nearly useless for global data communications which generally require a network to be able to sustain connection establishment rates in excess of 10 connections per second per client computer.

The second technology, a connectionless network, provides only best-effort delivery of data packets, routing every packet separately step-by-step to its ultimate destination. This scheme is analogous to a postal service, whereby every message is delivered to its recipient by the address, but sorting centers do not keep track of who communicates with whom. The connectionless packet switching technology is the basis of TCP/IP, the set of protocols defining the Internet.

Obviously, connectionless packet switching does not have connection establishment rate limitations. However, the process of finding the appropriate next step for routing a packet by the packet's destination address is non-trivial and generally cannot be implemented in very high-speed circuitry. Therefore, existing commercial IP routers have relatively low throughput.

Virtual connections in connectionless networks are identified with source and destination host addresses expanded with source and destination port numbers within those computers, to permit multiple concurrent connections between the hosts. An important feature of modem host TCP/IP implementations is that they expect packets sent into the network to be received in the same order. Violation of packet ordering causes false detection of packet loss by the fast retransmission algorithm, thus significantly degrading network performance.

FIGS. 1A and 1B illustrate architectures of existing IP routers. FIG. 1A shows the architecture of a router by Cisco Systems, whereby all packets arriving to the router have to traverse a shared system bus 30, after being processed by interface processors 31. A central processor 32 controls operation of interface processors 31 and performs routing of non-typical data packets which cannot be completely processed by the interface processors. The bus throughput severely limits the router's aggregate throughput. Moreover, the bus and the central processor are single points of failure; therefore the reliability of such routers is also somewhat limited.

FIG. 1B shows a more advanced IP routing technology by NetStar, whereby the shared bus is replaced with a crossbar switch 33. Crossbar switch 33 allows much greater aggregate throughput, but the throughput per attached line remains limited. Moreover, crossbar switches are not scalable and are limited by the speed of scheduling circuitry.

In U.S. Pat. No. 5,274,631 to Bhardwaj (1993), a packet switch built with a plurality of packet processors and a multiplexing means would allow greater aggregate throughput, but the preferred embodiment is described as not scalable. Also, the described apparatus is unable to perform IP routing (an OSI reference model Level 3 operation) since it is designed to perform Ethernet packet switching (a Level 2 operation).

U.S. Pat. No. 5,537,403, U.S. Pat. No. 5,550,815 and U.S. Pat. No. 5,554,160, all to Cloonan and Richards (1996), U.S. Pat. No. 5,469,433 to McAuley (1995) and U.S. Pat. No. 5,303,232 to Proctor et al. (1994), all describe parallel apparata for very high speed ATM (connection-oriented) packet switching. However, none of these address the issue of connection establishment rates as a limitation to the overall packet router performance, nor do they improve per-line throughput.

A number of related prior art works relate to the data interconnect part of the present invention and can be therefore be incorporated to achieve further improvements: U.S. Pat. No. 5,191,578 to Lee (1993), U.S. Pat. No. 5,175,733 to Nugent (1992), U.S. Pat. No. 5,218,676 to Ben-Ayed and Merriam (1993), U.S. Pat. No. 5,404,562 to Heller and Oliveau (1995), U.S. Pat. No. 5,345,556 to Zapisek (1994), U.S. Pat. No. 5,226,125 to Balmer et al. (1993), U.S. Pat. No. 5,247,694 to Dahl (1993), and U.S. Pat. No. 4,598,400 to Hillis (1986), all. However, those works are neither necessary nor sufficient for achieving the objects and advantages of the present invention.

SUMMARY OF THE INVENTION

Accordingly, one object of the present invention is to achieve practically unlimited aggregate and per-line data throughput of a connectionless packet network router.

Additional objects of the present invention are:

to limit high-speed circuitry to very simple functions;

to provide scalability by several orders of magnitude;

to achieve a high degree of fault-tolerance and availability; and to achieve traffic pattern insensitivity.

Other objects and advantages include low initial and build-up costs because of scalability and simplified high-speed circuitry, and an ability to replace or upgrade components of the system without service interruption.

Further objects and advantages will become apparent from a consideration of the ensuing description and drawings.

These and other objects and advantages of the present invention are achieved by a system arranged for routing data packets between a plurality of high-speed communication lines. The system includes a plurality of multiplexers, each multiplexing a plurality of low-speed communication lines into a high-speed communication line; a plurality of processing nodes, wherein each processing node has a low-speed communication line attached; and a data interconnect attached to the processing nodes.

Each processing node includes dedicated or programmable digital circuitry for routing data packets between the low-speed communication lines and other processing nodes.

The embodiment of the present invention is effected by a method of routing messages, so that the processing nodes are acting cooperatively to achieve high-speed packet routing between the high-speed circuits.

The method includes steps of demultiplexing incoming high-speed traffic by a multiplexer attached to an input high-speed data communication line; receiving a data packet by a processing node from a multiplexer a over a low-speed communication line; determining a proper output high-speed communication line for a received data packet by searching in a routing table; selecting a low-speed communication line attached to the same multiplexer as the output high-speed communication line, by computing a value of a hash function from the packet's source and destination addresses; determining an identifier of the processing node which has the selected low-speed communication line attached; forwarding the packet to the identified processing node, so that processing node will forward the packet to the low-speed communication line for further aggregation into traffic over the high-speed communication line by the corresponding multiplexer.

DRAWINGS

Figure 1A:
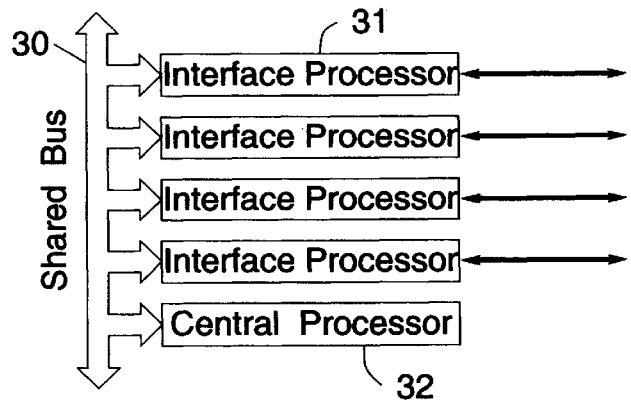
FIG. 1A is a block diagram of a shared bus-based packet router, a prior art (Cisco Systems).
Figure 1B:
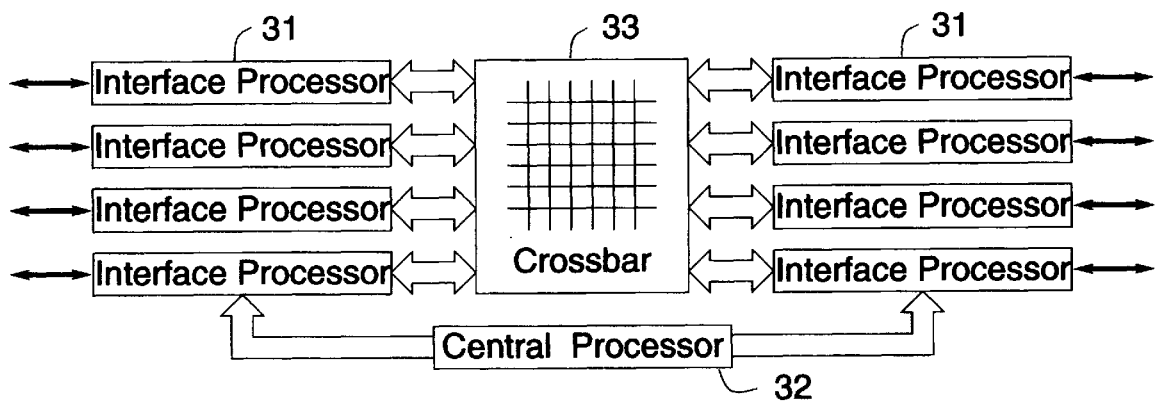
FIG. 1B is a block diagram of a crossbar switch-based packet router, a prior art (Ascend/NetStar).

10 multiple-instruction multiple-data massively parallel computer
11 processing node
12 network interface
13 data interconnect
14 low-speed communication line
15 multiplexer
16 high-speed communication line
17 low-speed multiplexer port
20 central office installation

DETAILED DESCRIPTION OF THE PREFERRED EMBODIMENT

Figure 2:
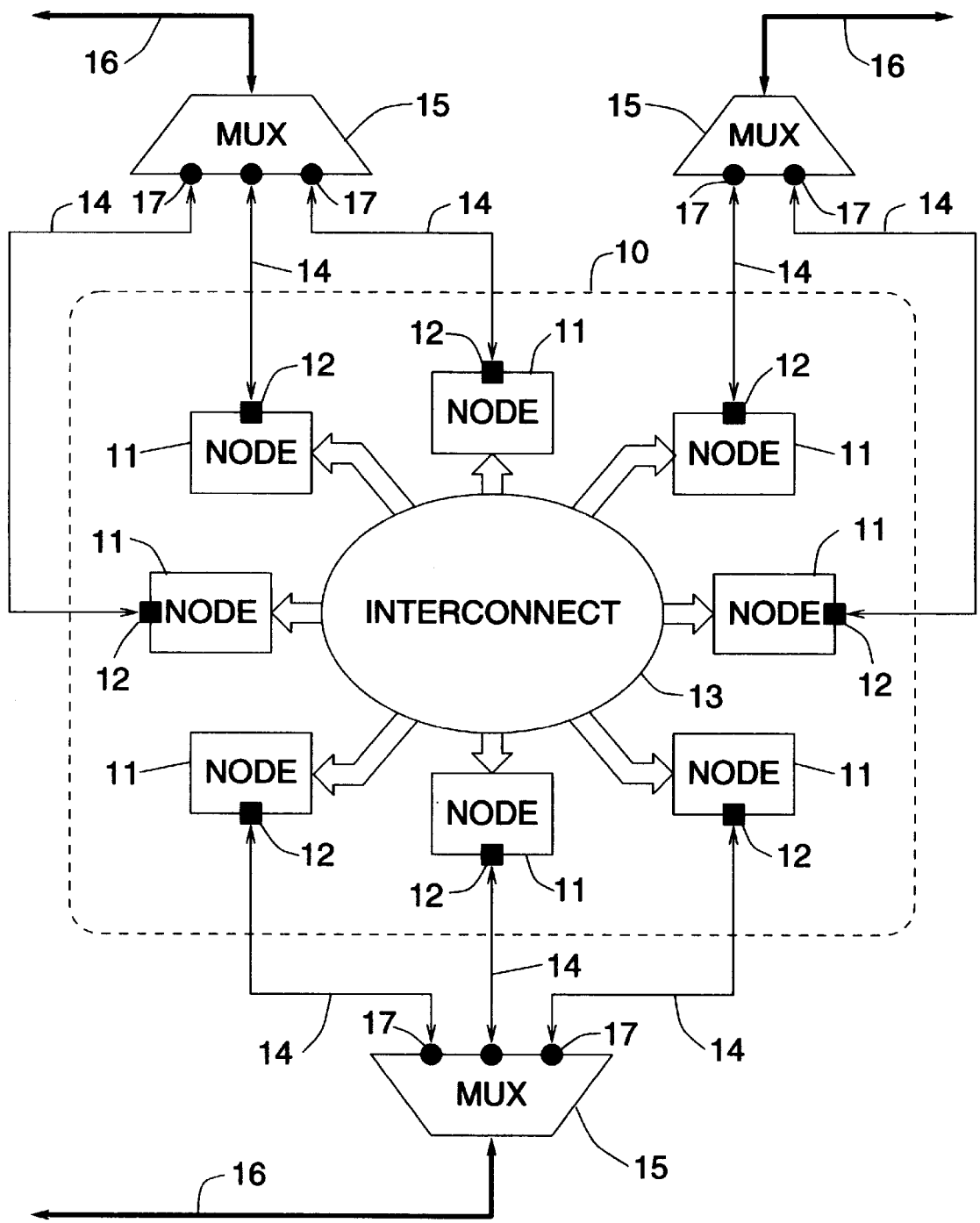
FIG. 2 is a block diagram of a scalable parallel packet router according to the invention.

A preferred embodiment of a scalable parallel packet router comprises a multiple-instruction multiple-data (MIMD) massively parallel computer 10 and a plurality of multiplexers 15, as shown in FIG. 2.

A MIMD computer 10 comprises of plurality of processing nodes 11 equipped with independent system buses, memory units and network interfaces 12. All processing nodes 11 are connected to data interconnect 13. Data interconnect 13 allows processing nodes 11 to exchange messages.

The processing nodes 11 are able to queue data packets and perform the steps of the method for routing data packets as described below, and maintain data sets utilized by the method. This means that general-purpose data processors are suitable for the purpose of the present invention, however specialized I/O processors can be used to achieve a better price/performance ratio.

The preferred technology for data interconnect 13 provides for linear scalability; i.e. the capacity of data interconnect 13 is proportional to the number of processing nodes 11 attached. Such preferred technologies include a hypercube, a butterfly switch and a fat tree. A detailed description of those technologies can be found in *Introduction To Parallel Algorithms And Architectures: Arrays, Trees, Hypercubes* by F. Thomson Leighton, Morgan Kaufmann Publishers, 1992.

Although linear scalability is a preferable property of a data interconnect 13, other interconnect technologies (such as crossbar switches, arrays, toroids et al.) for connecting large numbers of processing nodes 11 may be adequate. Duration of message propagation delay in an interconnect is not important for purposes of the present invention.

An acceptable data interconnect 13 will not reorder messages sent from one processing node 11 to another. Since propagation time between processing nodes 11 within the same massively-parallel computer 10 is very small, a reordering data interconnect 13 can be used if augmented by an algorithm restoring the original order upon receiving. This can be achieved by attaching sequence numbers to the messages addressed to every node, so that node can hold out-of-order packets until preceding packets are received.

Multiplexers 15 are devices which combine data traffic from a number of low-speed circuits into a single high-speed circuit, without any modification of the content. Multiplexers 15 do not perform any routing decisions, i.e. all data received by a multiplexer's port 17 will be emitted by a single port on another multiplexer, with the statically configured correspondence between source and destination ports.

The simplest multiplexers are synchronous, wherein the share of, high-speed communication line's capacity allocated to every low-speed port 17 is constant, and the capacity of the high-speed communication line 16 can not be less than the sum of the capacities of all low-speed communication lines 14 attached to the multiplexer 15. The preferred embodiment of the present invention incorporates such synchronous multiplexers 15 but other types of multiplexers (such as stochastic or ring add-drop multiplexers) can be substituted.

Figure 4:
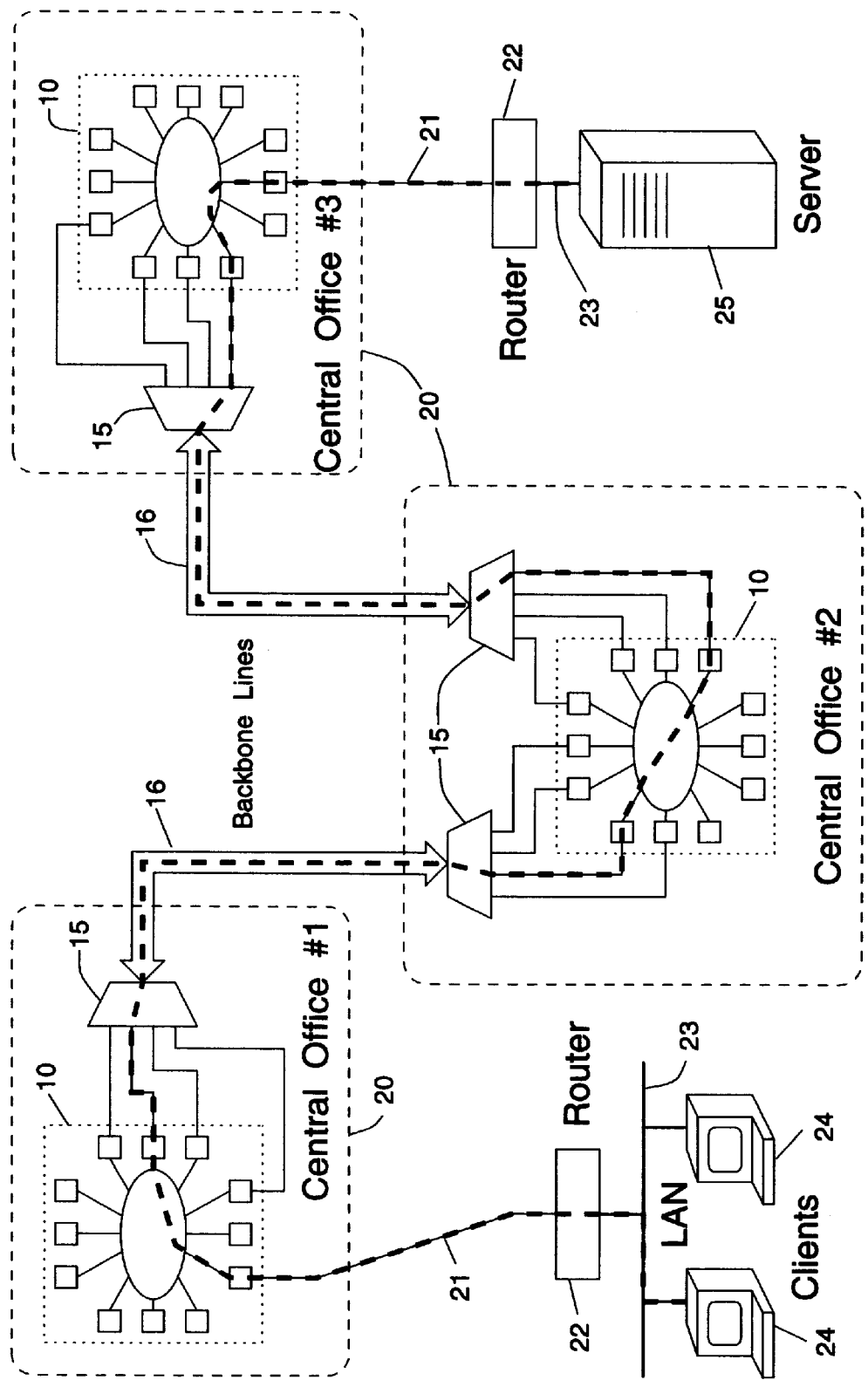
FIG. 4 is a schematic diagram illustrating packet routing in a network employing scalable parallel packet routers.

Processing nodes 11 are connected to multiplexers 15 with low-speed communication lines 14, and multiplexers 15 are connected to high-speed communication lines 16 which serve as backbone lines interconnecting central offices 20 in a wide-area network, as shown in FIG. 4.

The number of low-speed communication lines 14 connected to a multiplexer 15 should be sufficient to pass enough traffic to load the corresponding high-speed communication line 16. The processing capacity of nodes 11 and the capacity of their connections to the data interconnect 13 must be sufficient to load the low-speed communication lines 14.

Figure 5:
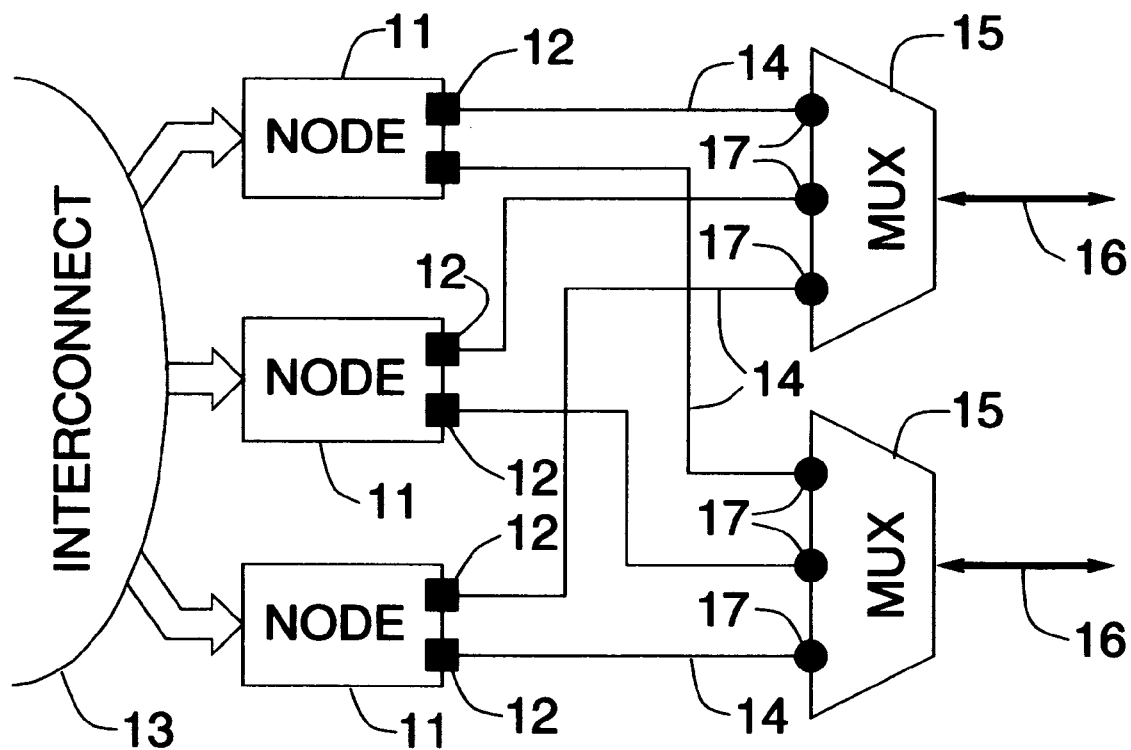
FIG. 5 is a block diagram of an interconnection of multiple-interface processing nodes with multiplexers.

Processing nodes 11 can be equipped with several network interfaces 12 as shown in FIG. 5, thus allowing attachment to more than one multiplexer 15. In some cases that allows traffic to bypass the data interconnect 13.

Figure 6:
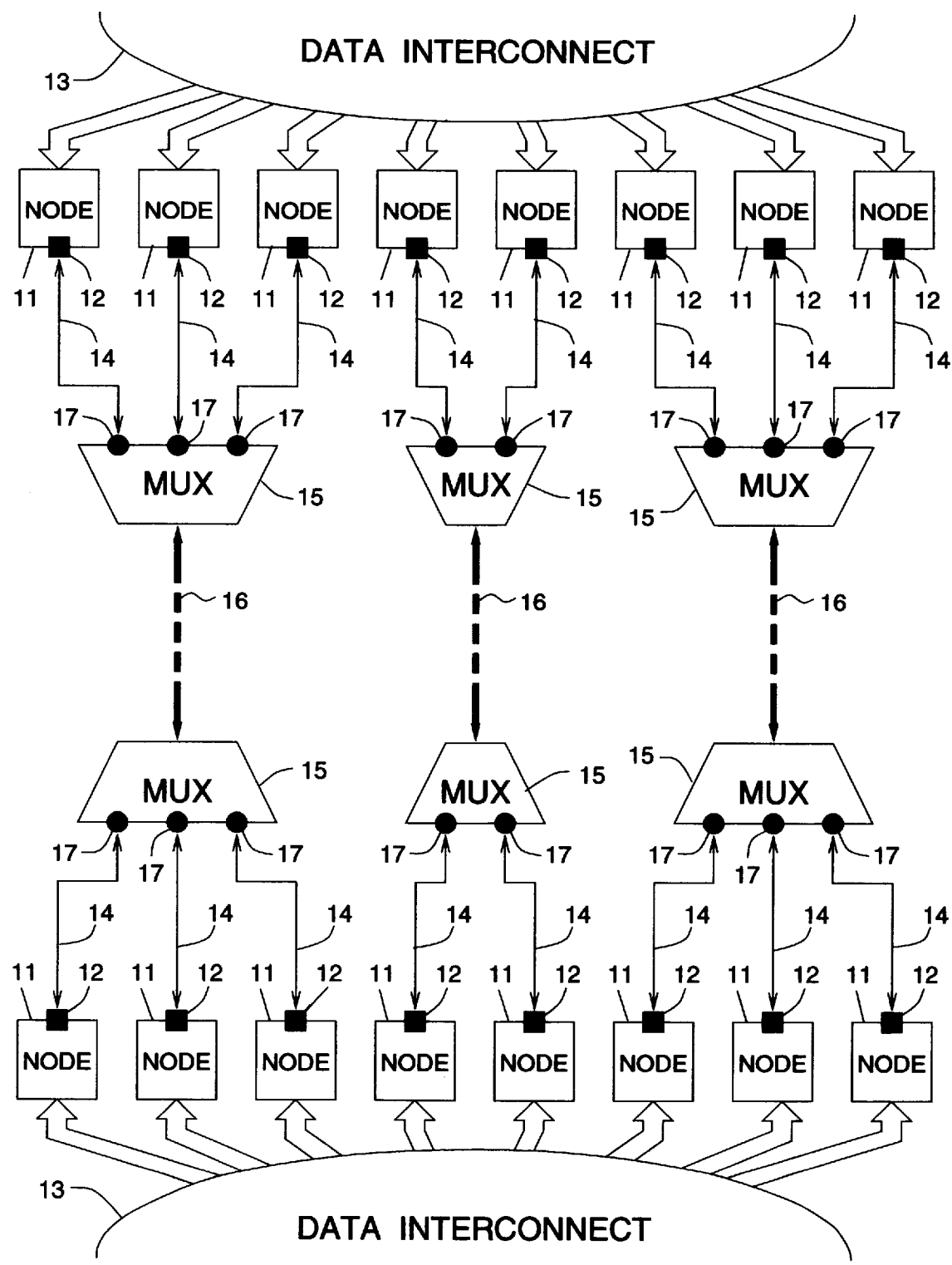
FIG. 6 is a block diagram of an attachment of inversely multiplexed parallel communication lines.

Although the capacity of multiplexers 15 can be much higher than the capacity of switching and routing equipment, it may still be a limiting factor on the performance of the entire system. To achieve even higher performance a plurality of parallel high-speed communication lines 16 can be used (as shown in FIG. 6) to form a single logical very high-speed circuit (this technique is known as inverse multiplexing).

A scalable parallel packet router according to the invention forwards data packets to different high-speed communication lines 16 based on destination addresses attached to the packets, according to the content of a routing_table data set. Routing_table sets a correspondence between ranges of destination addresses and identifiers of high-speed communication lines 16 where data packets should be sent in order to reach their destinations.

In addition to destination addresses, data packets carry source addresses, and optionally source and destination port numbers. Such port numbers are used by source and destination host computers to distinguish between different concurrent communication sessions.

Traffic on high-speed communication lines 16 is aggregated from traffic on a number of low-speed communication lines 14 by multiplexers 15. The association of those low-speed communication lines 14 with high-speed communication lines 16 and processing nodes 11 is static, and is reflected in two data sets used in operation of the present invention:

(a) nexit_table contains the number of low-speed communication lines 14 aggregated into a high-speed communication line 16, for every high-speed communication line 16. This data set is indexed by high-speed communication line identifiers.

(b) exit_table contains the map of correspondence between multiplexer ports 17 and network interfaces 12, corresponding to the actual attachment of low-speed communication lines 14. This data set is indexed by pairs (high-speed communication line identifier, multiplexer port number), and contains pairs (processing node identifier, interface identifier) uniquely identifying network interfaces 12. Effectively, all network interfaces 12 are split into groups corresponding to high-speed communication lines 16.

Copies of the above two data sets should be stored in all active processing nodes 11, in addition to the routing-table data set. A simple broadcasting over data interconnect 13 can be used to propagate changes to all copies of the data sets.

Figure 3:
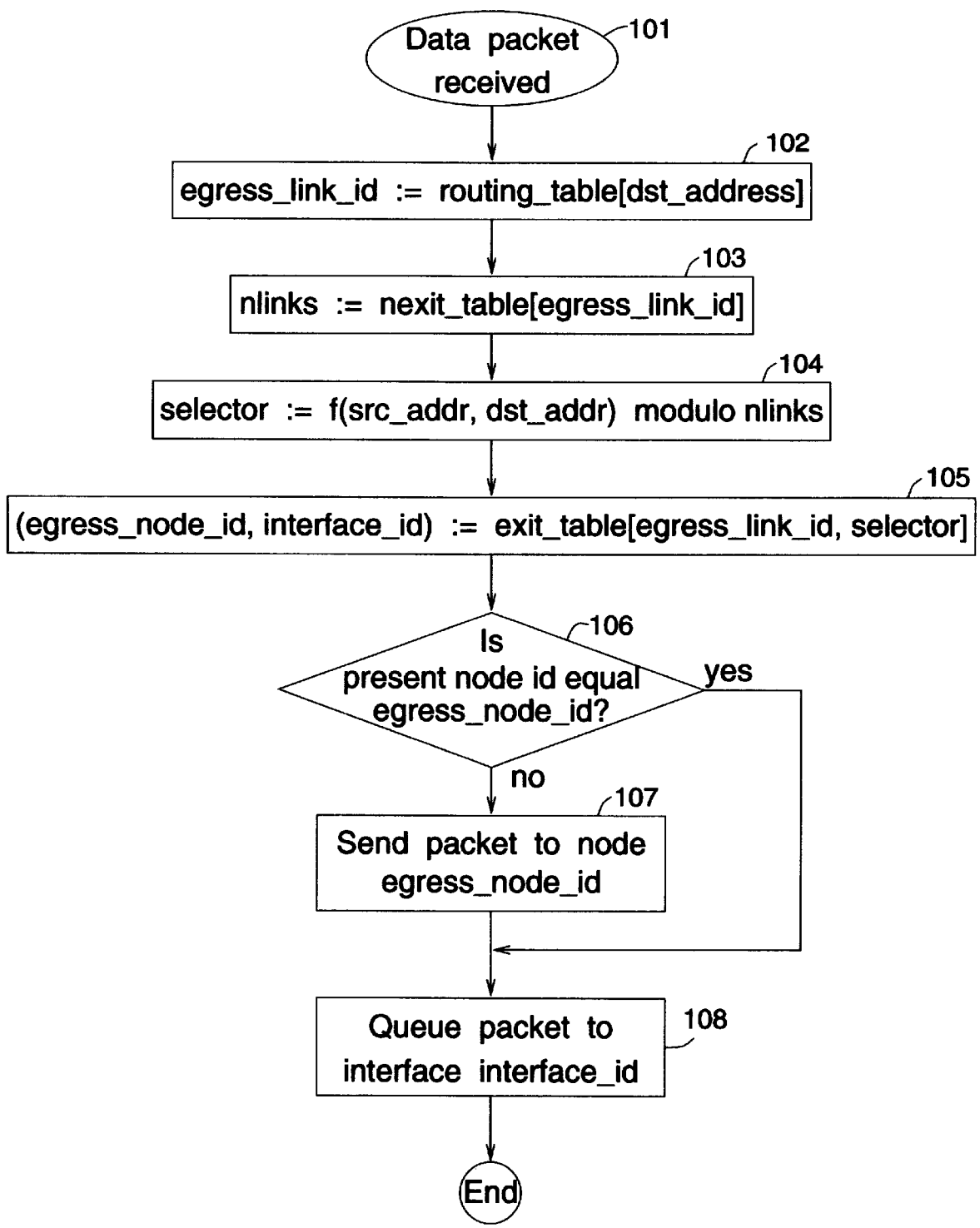
FIG. 3 is a flow chart of the packet routing algorithm performed by a processing node upon receipt of a data packet.

When a data packet is received from a high-speed communication line 16, multiplexer 15 forwards it to a low-speed communication line 14 (selection of the particular low-speed communication line is not important), so it will be received by a processing node 11. The processing node 11 performs the following steps, as shown in FIG. 3:

(101) Receive the data packet.

(102) Determine an egress high-speed communication line identifier from the packet's destination address using the routing_table data set.

(103) Determine a number of low-speed communication lines associated with the egress high-speed communication line using the nexit_table data set.

(104) Calculate an integer value of a hash function from the packet's source and destination addresses and (optionally) source and destination port addresses. Suitable hash functions produce integer values uniformly distributed between zero and some large number. A low-speed communication line 14 is selected by a remainder from the division of the value of the hash function by the number of low-speed communication lines associated with the egress high-speed communication line, as determined in step 103.

(105) Determine the egress processing node identifier and network interface identifier from the high-speed communication line identifier (from step 102) and the low-speed communication line number (from step 104) using the exit_table data set.

(106) If the present processing node's identifier equals the identifier of the egress processing node (from step 105), skip step 107.

(107) Send the data packet to the egress processing node along with the network interface identifier (from step 105) by means of data interconnect 13 using the egress processing node identifier (from step 105).

(108) When the egress processing node 11 receives the data packet, it queues the packet for the transmission over the network interface 12. If the processing node has several interfaces 12, the interface is selected by the identifier received with the packet.

When the data packet is finally transmitted by network interface 12 it will reach multiplexer 15 which in turn will aggregate the packet into the outgoing high-speed data stream over the egress communication line 16.

As the reader can see, a stream of packets with different addresses forwarded to the same egress high-speed communication line 16 will be randomly and uniformly distributed between all low-speed communication lines 14, and corresponding processing nodes 11, thus creating a statistically uniform load on those components of the system.

When traffic generated by such a system is received from ingress high-speed communication line 16, the demultiplexing results in a statistically uniform distribution of arriving packets over low-speed communication lines 14 and corresponding processing nodes 11, thus likewise creating a statistically uniform load on those components of the system.

The uniform load distribution allows the attachment of an arbitrarily large number of processing nodes 11 per high-speed communication line 16, making possible packet routing at arbitrarily high data rates.

When a packet traverses a network (see FIG. 4) from a client computer 24 to a destination server computer 25, all packets within one communication session will have the same source and destination addresses. Therefore, when all packets within this communication session are received by a processing node 11 at a central office 20, they will be forwarded to the same egress processing node 11 and therefore reach the same multiplexer port 17 at the egress backbone line 16. Since the process is similar at every central office 20, all packets within the same communication session will follow the same path. This guarantees that packets within a communication session will not be reordered (i.e. they will arrive at the destination computer 25 in the same order as they were sent by the source computer 24), although the global ordering of packets is not preserved.

In the case of inverse multiplexing (as shown in FIG. 6) all parallel high-speed communication lines 16 must be assigned the same identifier, and corresponding multiplexers 15 should be assigned port identifiers forming an unbroken sequence of integer numbers starting from zero. Given such an assignment, the algorithm described above treats such parallel communication lines 16 as a single very high-speed communication line. This is equivalent to including all network interfaces 12 corresponding to all inversely multiplexed high-speed communication lines 16 into the same group.

Figure 7A:
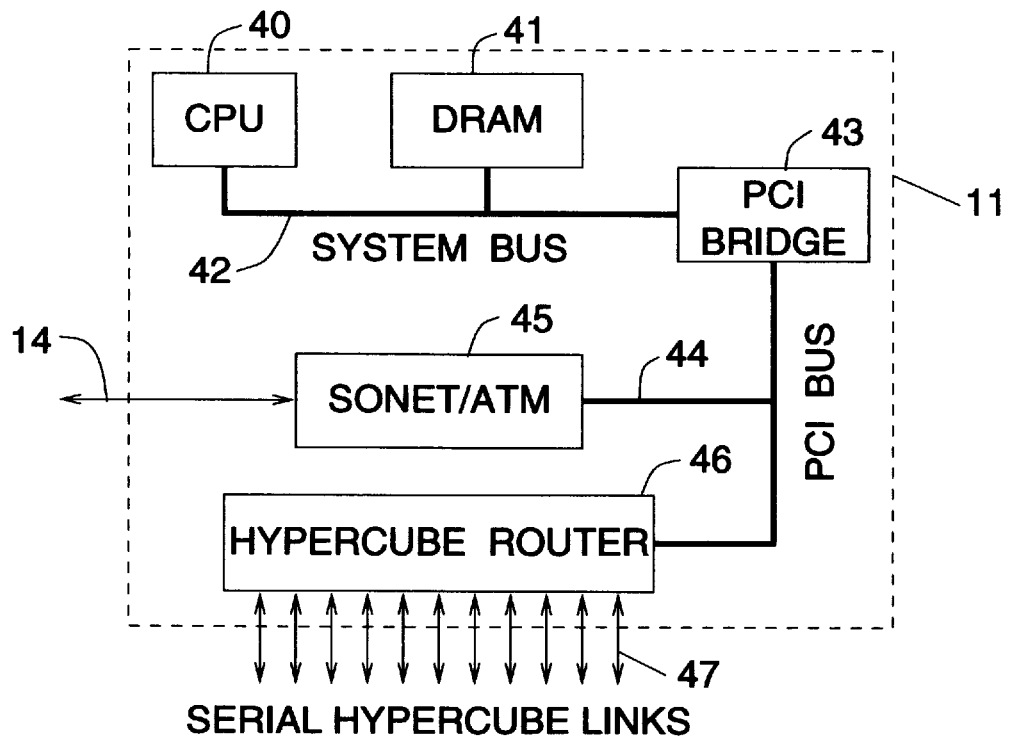
FIG. 7A is a block diagram of a particular embodiment of a processing node.
Figure 7B:
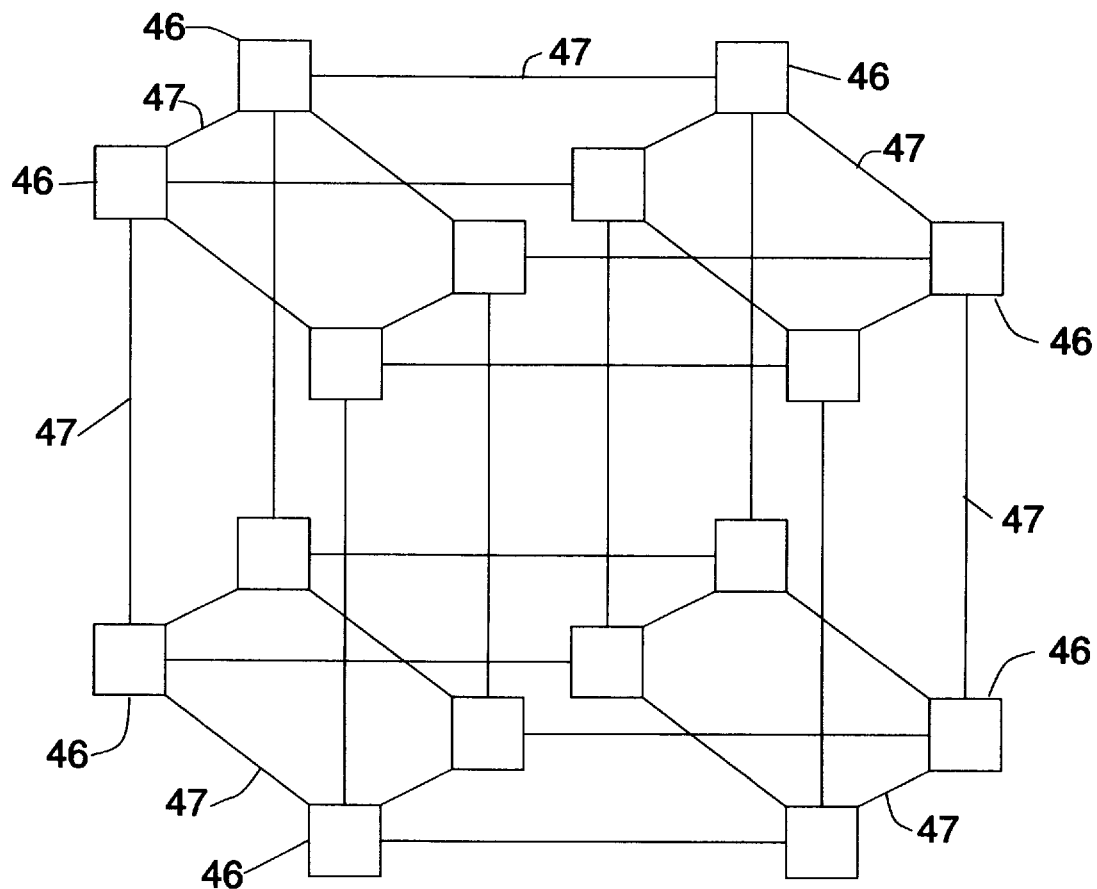
FIG. 7B is a block diagram of a particular embodiment of a data interconnect.

A particular embodiment of the present invention for routing IP packets between sixteen OC-192 (10 Gbps) fiber optic backbone communication lines includes sixteen commercially available SONET multiplexers 15 each with one OC-192c and sixty four OC-3c (155 Mbps) interfaces, and a massively parallel computer with 1024 processing nodes. Processing nodes are single-board computers (an example of an appropriate design for such computer is shown in FIG. 7A). Each processing node is equipped with an OC-3c SONET/ATM interface 45, a CPU 40 with clock frequency sufficient to route IP packets at 155 Mbps (for example, a 133 MHz Pentium by Intel), 16 megabytes of DRAM 41, and an interface to a custom hypercube router chip 46. The data interconnect is constituted by a collection of hypercube router chips 46 (one per node) and 200 Mbps serial links 47 interconnecting the hypercube router chips, as shown in FIG. 7B. The OC-3c interfaces 45 of the processing nodes are connected to the OC-3 ports of SONET multiplexers 15 with fiber-optic cables 14, in a manner shown in FIG. 2. The resulting apparatus is able to route IP packets at aggregate speeds of 160 Gbps.

Although the description above contains many specifics, these should not be construed as limiting the scope of the invention but as merely providing illustrations of some of the presently preferred embodiments of this invention. For example, a machine comprising specialized input-output processing nodes can be used in place of a general purpose massively parallel computer.

Thus, the scope of the invention should be determined by the appended claims and their legal equivalents, rather than by the examples given.

I claim:

1. A device for routing data packets between high-speed communication lines, comprising:

a data interconnect circuit;

a first processing node that receives data packets from a first high-speed communication line and is adapted to forward data packets via said data interconnect circuit;

second and third processing nodes each adapted to receive data packets from said first processing node via said data interconnect circuit;

first and second low-speed communication lines respectively coupled to said second and third processing nodes; and a multiplexer having at least two input ports, said multiplexer being adapted to send data packets over a second high-speed communication line, said sent data packets being received via said at least two input ports, said first and second low-speed communication lines being respectively coupled to said at least two input ports, said first, second, and third processing nodes being operative such that a first stream of data packets having a plurality of different sources and destinations are routed from said first high-speed communication line to said second high-speed communication line via a uniform distribution of said first and second low-speed communication lines, while a second stream of data packets each having the same source and destination are routed from said first high-speed communication line to said second high-speed communication line via only one of said first and second low-speed communication lines.

2. A device as defined in claim 1, wherein said first processing node determines which of said second and third processing nodes to forward data packets to in accordance with a hash algorithm performed using said sources and destinations.

3. A device as defined in claim 1, wherein said first and second low-speed communication lines have an aggregate capacity greater than or equal to a capacity of said second high-speed communication line.

4. A device as defined in claim 1, wherein said data interconnect circuit is linearly scalable in accordance with a total number of processing nodes coupled thereto.

5. A device as defined in claim 1, wherein said sources and destinations are derived from source and destination addresses of said data packets.

6. A device as defined in claim 1, wherein said sources and destinations are derived from source and destination addresses and source and destination ports of said data packets.

7. A device as defined in claim 1, further comprising:

third and fourth low-speed communication lines respectively coupled to said second and third processing nodes; and a second multiplexer having at least two second input ports, said second multiplexer being adapted to send data packets over a third high-speed communication line, said sent data packets being received via said at least two second input ports, said third and fourth low-speed communication lines being respectively coupled to said at least two second input ports, said first, second, and third processing nodes being operative such that a third stream of data packets having a plurality of different sources and destinations are routed from said first high-speed communication line to said third high-speed communication line via a uniform distribution of said third and fourth low-speed communication lines, while a fourth stream of data packets each having the same source and destination are routed from said first high-speed communication line to said third high-speed communication line via only one of said third and fourth low-speed communication lines.

8. A device as defined in claim 1, further comprising:

fourth and fifth processing nodes each adapted to receive data packets from said first processing node via said data interconnect circuit;

third and fourth low-speed communication lines respectively coupled to said fourth and fifth processing nodes; and a second multiplexer having at least two second input ports, said second multiplexer being adapted to send data packets over said second high-speed communication line, said sent data packets being received via said at least two second input ports, said third and fourth low-speed communication lines being respectively coupled to said at least two second input ports, said first, second, third and fourth processing nodes being operative such that a third stream of data packets having a plurality of different sources and destinations are routed from said first high-speed communication line to said second high-speed communication line via a uniform distribution of said first, second, third and fourth low-speed communication lines, while a fourth stream of data packets each having the same source and destination are routed from said first high-speed communication line to said second high-speed communication line via only one of said first, second, third and fourth low-speed communication lines.

9. A device for routing data packets between first and second high-speed communication lines, comprising:

a first multiplexer having at least two output ports, said first multiplexer being adapted to receive data packets from said first high-speed communication line, and to send said received data packets via said at least two output ports;

first and second low-speed communication lines respectively coupled to said at least two output ports;

first and second processing nodes respectively coupled to said first and second low-speed communication lines;

a data interconnect circuit;

third and fourth processing nodes each adapted to receive data packets from said first and second processing nodes via said data interconnect circuit;

third and fourth low-speed communication lines respectively coupled to said third and fourth processing nodes; and a second multiplexer having at least two input ports, said second multiplexer being adapted to send packets over said second high-speed communication line, said sent data packets being received via said at least two input ports, said third and fourth low-speed communication lines being respectively coupled to said at least two input ports, said first and second multiplexers and said first, second, third and fourth processing nodes being operative such that a first stream of data packets having a plurality of different sources and destinations are routed from said first high-speed communication line to said second high-speed communication line via a uniform distribution of said first, second, third and fourth low-speed communication lines, while a second stream of data packets each having the same source and destination are routed from said first high-speed communication line to said second high-speed communication line via only one of said third and fourth processing nodes.

10. A method for routing data packets between a plurality of high-speed communication lines in a data packet routing device, said method comprising:

receiving a data packet from a source high-speed communication line at a source multiplexer;

sending the data packet from the source multiplexer to a source network interface via a source low-speed communication line;

receiving the data packet at a source processing node;

determining from a destination address of the data packet a destination high-speed communication line and a destination multiplexer;

determining a number of multiplexer ports associated with the destination multiplexer;

selecting a destination multiplexer port, wherein the selecting step comprises the step of computing a function from a plurality of arguments comprising a source address of the data packet and the destination address of the data packet;

determining a destination processing node and a destination network interface associated with the destination processing node, wherein the destination network interface is connected to the selected destination multiplexer port by a low-speed communication line;

forwarding the data packet to the destination processing node; and sending the data packet to the destination high-speed communication line via the destination network interface, the low-speed communication line, and the destination multiplexer.

11. A method as defined in claim 10, wherein the function computing step comprises:

determining from the destination address of the data packet the destination high-speed communication line and the destination multiplexer;

calculating a value based on the source address and the destination address; and converting the value to a destination port number within a range of values corresponding to the number of ports of the multiplexer.

12. A method as defined in claim 11, wherein the calculating step comprises evaluating a hash function.

13. A method as defined in claim 11, wherein the value is calculated additionally based on a source port number of the data packet and a destination port number of the data packet.

14. A method as defined in claim 10, further comprising:

forwarding the data packet directly to the destination network interface if the determined destination processing node is the same as the source processing node.

15. A method as defined in claim 10, wherein the forwarding step comprises passing the data packet through a data interconnect circuit.

16. A method of forwarding packets between high-speed communication lines in a packet router device, said packet router device comprising a linearly scalable data interconnect circuit, a first processing node that receives data packets from a first high-speed communication line and is adapted to forward received data packets via said data interconnect circuit, a plurality of second processing nodes each adapted to receive data packets from said first processing node via said data interconnect circuit, a plurality of multiplexers respectively adapted to send data packets over a plurality of second high-speed communication lines, and a plurality of low-speed communication lines coupled between said second processing nodes and said multiplexers, said method comprising:

receiving a data packet from said first high-speed communication line at said first processing node;

determining from a destination address of said data packet a destination one of said second high-speed communication lines and a destination one of said multiplexers;

computing a function from a plurality of arguments including a source address of said data packet and said destination address of said data packet, said function returning a first value equal to a value returned for another source address and another destination address when said source and destination addresses are the same as said another source and destination addresses, said function returning a second value different than said first value when said source and destination addresses are different than said another source and destination addresses;

determining a destination one of said processing nodes connected to said destination multiplexer by one of said low-speed communication lines based on a returned value of said function;

forwarding said data packet to said destination processing node via said data interconnect circuit; and sending said data packet to said destination high-speed communication line via said connected low-speed communication line and said destination multiplexer.

17. A method as defined in claim 16, wherein said function computing step comprises:

determining a number of said low-speed communication lines connected to said destination multiplexer;

calculating a value based on said source address and said destination address of said data packet; and converting said value to said returned value, said returned value being within a range corresponding to said number of said low-speed communication lines.

18. A method as defined in claim 17, wherein said destination processing node determining step includes:

identifying connected ones of said processing nodes associated with said number of said low-speed communication lines; and selecting one of said connected ones of said processing nodes based on said returned value.

19. A method as defined in claim 16, wherein said function computing step comprises evaluating a hash function.

20. A method as defined in claim 16, wherein said plurality of arguments further includes a source port number of said data packet and a destination port number of said data packet.

21. A method as defined in claim 16, wherein said packet router device further includes an ingress multiplexer adapted to receive data packets from said first high-speed communication line, a plurality of ingress low-speed communication lines, said ingress multiplexer being adapted to send said data packets to processing nodes via said ingress low-speed communication lines, said first processing node being coupled to said ingress multiplexer via one said ingress low-speed communication lines, said method further comprising:

receiving ingress data packets at said ingress multiplexer;

uniformly distributing said ingress data packets among said ingress low-speed communication lines.

22. A method as defined in claim 16, further comprising:

adjusting the throughput of said packet router device, said adjusting step including:

identifying a present throughput of said packet router device; and adding or removing second processing nodes while connecting or removing corresponding low-speed communication lines between said added or removed second processing nodes and said multiplexer until said present throughput equals or exceeds a desired throughput.

\* \* \* \* \*

UNITED STATES PATENT AND TRADEMARK OFFICE
CERTIFICATE OF CORRECTION

PATENT NO.   : 6,044,080
DATED        : March 28, 2000
INVENTOR(S)  : Vadim Antonov Page 1 of 1

It is certified that error appears in the above-identified patent and that said Letters Patent is hereby corrected as shown below:

Delete "lines 45-54, in column 3"

Signed and Sealed this

Fourth Day of September, 2001

*Attest:*

*Attesting Officer*

NICHOLAS P. GODICI
*Acting Director of the United States Patent and Trademark Office*